United States Patent

[11] 3,616,960

[72] Inventors Tom B. Miller
    Grand Blanc;
    Harold W. Noponen, Flint, both of Mich.
[21] Appl. No. 39,102
[22] Filed May 20, 1970
[45] Patented Nov. 2, 1971
[73] Assignee General Motors Corporation
    Detroit, Mich.

[54] FILLER PIPE CLOSURE FOR PRESSURIZED FUEL TANK
    3 Claims, 6 Drawing Figs.
[52] U.S. Cl. .................................................... 220/39,
    220/40, 220/44
[51] Int. Cl. ..................................................... B65d 41/04,
    B65d 41/06
[50] Field of Search .......................................... 220/24 GT,
    39, 40, 44

[56] References Cited
    UNITED STATES PATENTS
2,649,776  8/1953  Konchan ..................... 220/40 X Primary Examiner—M. Henson Wood, Jr.
Assistant Examiner—Edwin D. Grant
Attorneys—J. L. Carpenter and C. K. Veenstra ABSTRACT: A pressurized fuel tank, disposed transversely over the rear axle of an automobile, is divided by baffles into three compartments. Large apertures in the baffles interconnect the upper portion of the compartments and a pipe extending through the baffles interconnects the lower portion of the compartments. A fuel pump inlet is located in the center compartment adjacent an opening in the pipe. A pressure relief valve discharges from the center compartment adjacent the vehicle centerline. A filler pipe extends through one of the end walls and one of the baffles to discharge adjacent the vehicle centerline. A cap on the filler pipe is provided with a vacuum relief valve. Pressure in the tank is also released during removal of the cap.

PATENTED NOV 2 1971
3,616,960
SHEET 1 OF 2
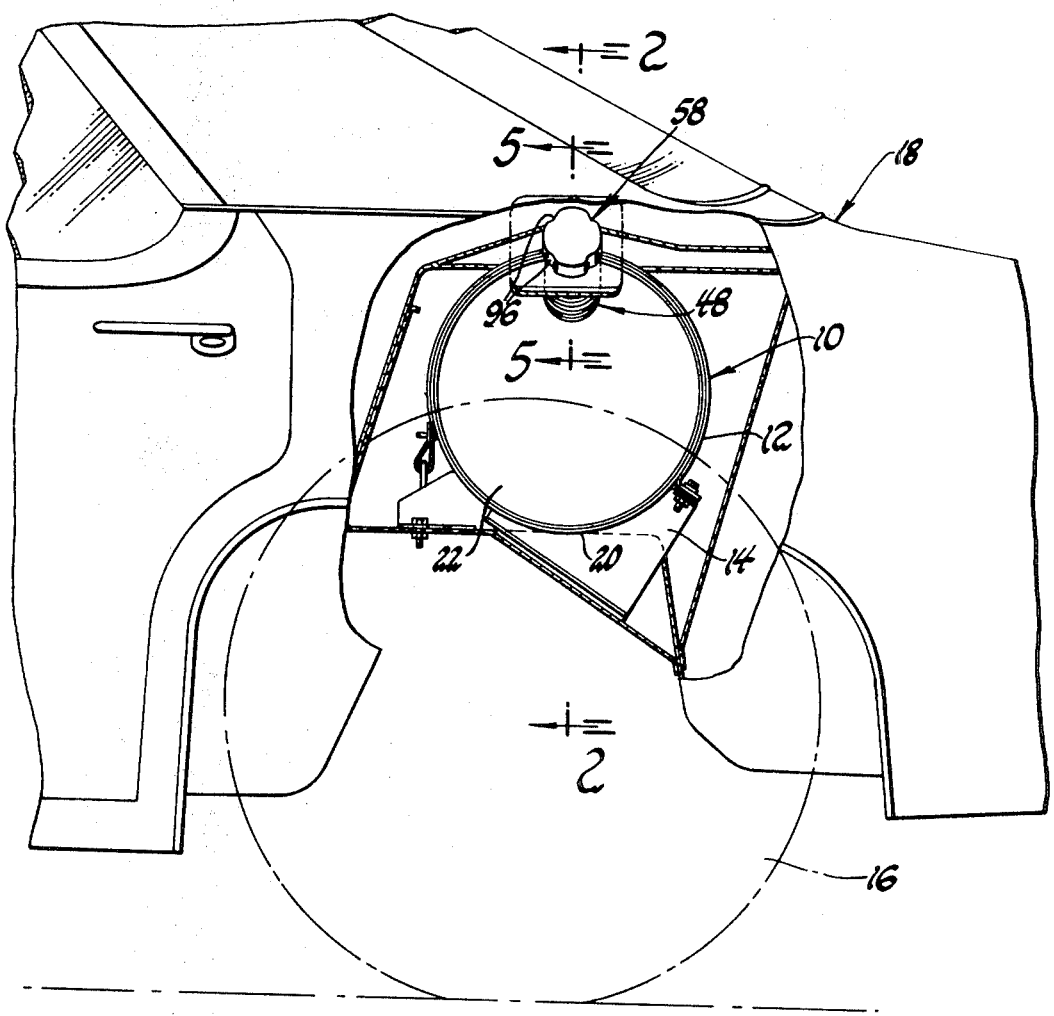
Fig. 1
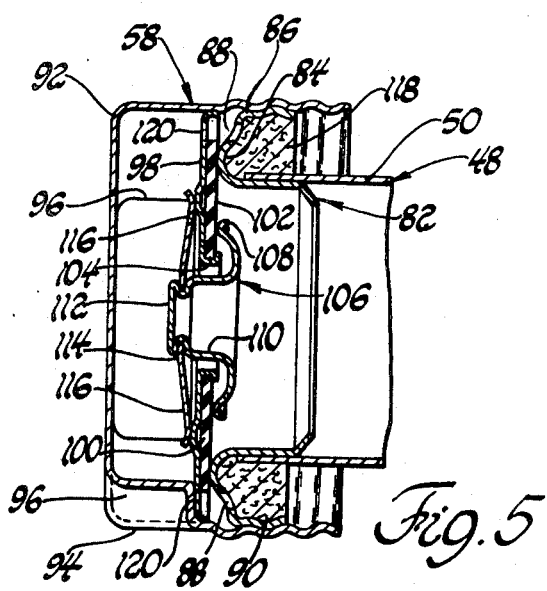
Fig. 5
Fig. 6
INVENTORS
Tom B. Miller &
BY Harold W. Noponen
C. K. Veenstra
ATTORNEY

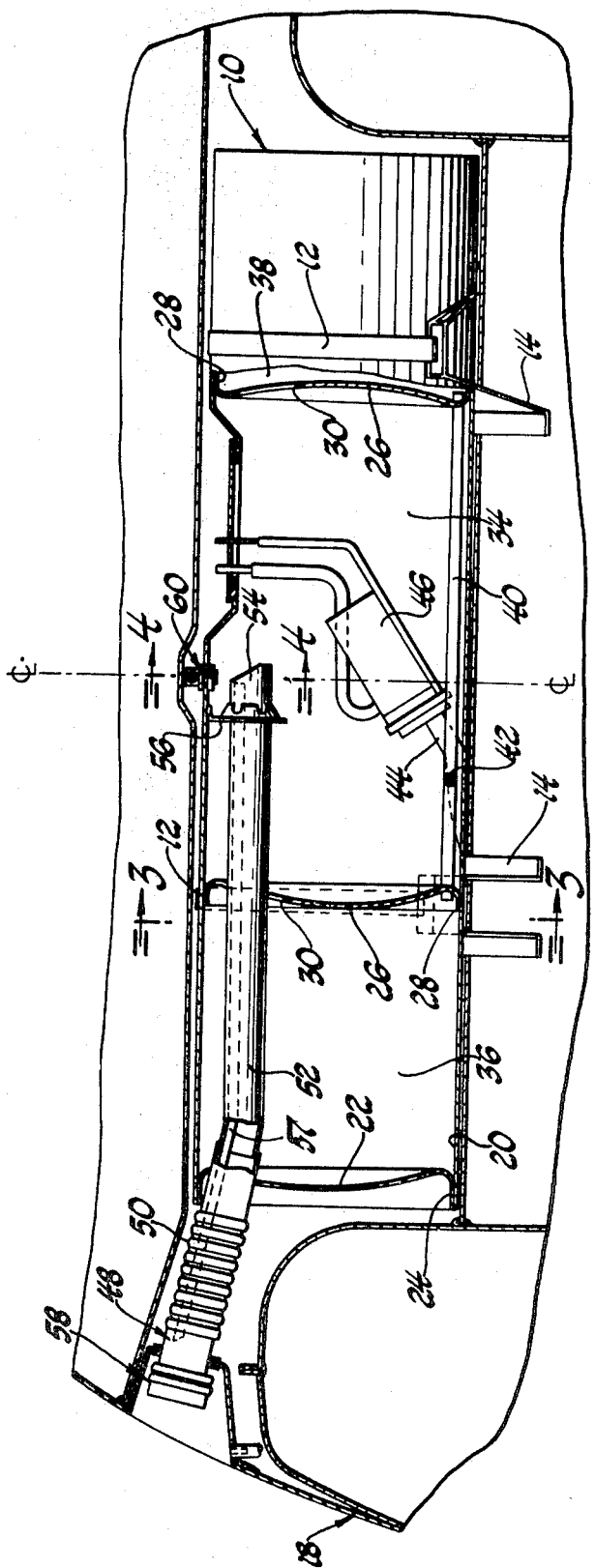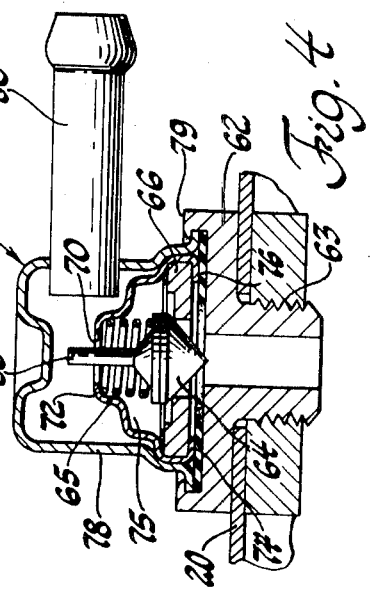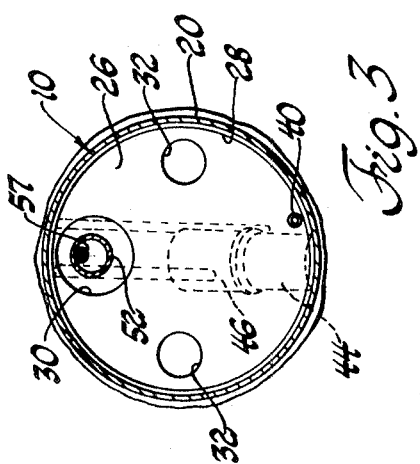

FILLER PIPE CLOSURE FOR PRESSURIZED FUEL TANK

This invention provides a closure arrangement for a pressurized fuel tank filler pipe which completely releases the pressure in the tank during the process of unscrewing the closure cap from the filler pipe.

The details as well as other objects and advantages of this invention are shown in the drawings and discussed below.

FIG. 1 is a side elevational view of a vehicle taken partially in section to show a pressurized fuel tank mounted over the rear axle;

FIG. 2 is a sectional view taken along line 2—2 of FIG. 1 showing the construction of the tank;

FIG. 3 is a sectional view taken along line 3—3 of FIG. 2 illustrating the disposition of the baffle apertures in the upper portion of the tank and the pipe in the lower portion of the tank;

FIG. 4 is a sectional view taken along line 4—4 of FIG. 2 illustrating the construction of the pressure relief valve;

FIG. 5 is a sectional view of the filler pipe and cap construction, taken as indicated generally by line 5—5 of FIG. 1; and FIG. 6 is a view of the spring which biases the vacuum relief valve in the filler cap.

Referring first to FIG. 1, a fuel tank 10 is clamped by bands 12 to supporting brackets 14 between the rear wheels 16 and over the rear axle (not shown) of a vehicle 18.

As shown in FIG. 2, tank 10 has a generally cylindrical housing 20 with its longitudinal axis extending transversely of the vehicle centerline. An outwardly convex end cap 22 closes each end of housing 20 and has an outwardly extending peripheral rim 24 secured to housing 20. It will be noted that the end caps 22 are disposed on opposite sides of the centerline of the vehicle and substantially equidistant therefrom.

A pair of lateral surge-controlling baffles 26 disposed on opposite sides of the vehicle centerline and outwardly convex with respect thereto also have outwardly extending peripheral rims 28 secured to housing 20. As best illustrated in FIG. 3, each baffle 26 has a large aperture 30 extending therethrough in the top portion of tank 10 and a pair of smaller apertures 32 extending therethrough near the midportion of tank 10. Henceforth the mid and top portions of tank 10 will be collectively referred to as the upper portion of tank 10.

Apertures 30 and 32 provide free fluid communication between the center compartment 34 and the end compartments 36 and 38 in the upper portion of tank 10. An open-ended pipe 40 extends through baffles 26 in the lower portion of tank 10 and has a lateral opening 42 discharging adjacent the inlet sock 44 of an in-tank fuel pump 46 disposed in center compartment 34.

It will be appreciated that a continuous supply of fuel must disposed adjacent fuel pump inlet sock 44 in all attitudes and during all maneuvers of the vehicle. When tank 10 is full, liquid fuel may freely enter center compartment 34 from end compartments 36 and 38 through baffle apertures 30 and 32. When only the lower portion of tank 10 contains fuel, baffles 26 direct liquid fuel from end compartments 36 and 38 through pipe 40 to its lateral opening 42 and assure that liquid fuel is discharged adjacent inlet sock 44. In one construction, a 12-inch diameter tank was provided with a ½-inch diameter pipe located about 1.87 inches to the rear of the tank longitudinal axis; the pipe has a 0.375-inch diameter lateral hole.

A filler pipe 48 has a corrugated neck 50 extending through one end wall 22 and an inner extension 52 extending through opening 30 in one baffle 26. Filler pipe 48 terminates at a discharge end 54 adjacent the vehicle centerline. Discharge end 54 is supported by a bracket 56 and is beveled to permit easy insertion into tank 10 and bracket 56. A vent tube 57 is secured in filler pipe 48. A filler cap 58, described in greater detail below, closes filler pipe 48.

A pressure relief valve 60 is inserted through an opening in housing 20 in the uppermost portion of tank 10 adjacent the vehicle centerline. As shown in FIG. 4, valve 60 has a base 62 which is threaded at 63 for fastening to tank housing 20. A conical valve 64 is biased by a spring 65 against a valve seat member 66. A stem 68 on valve 64 extends through a large opening 70 in a cage 72 which is spun around valve seat member 66 as at 74 to retain valve 64, spring 65 and valve seat 66 in an integral unit 75.

A gasket 76 is disposed between valve unit 75 and base 62 and a cover 78 encloses valve unit 75. The rim 79 of base 62 is staked over and secures cover 78. A fitting 80 discharges from cover 78.

In operation, valve 64 is biased against seat 66 until a predetermined pressure in tank 10 is exceeded. Valve 64 is then unseated against the bias of spring 65 and the pressure is relieved through fitting 80. A discharge hose may be secured to fitting 80 as desired.

As shown in FIG. 5, an adapter member 82, secured within filler neck 50, has a rounded sealing lip 84 extending radially outwardly from filler neck 50, a portion 86 extending outwardly from sealing lip 84 and provided with apertures 88, and a securing flange 90 spaced radially outwardly from and surrounding filler neck 50 and extending axially from the outer edge of apertured portion 86. It will be noted that securing flange 90 has a thread rolled therein.

Filler cap 58 is formed of a cupped housing 92 with an axially extending rim 94. A thread rolled in rim 94 mates with the thread rolled in securing flange 90.

As may be seen in FIG. 1, rim 94 has a plurality of peripherally spaced indentations 96 to assist in gripping the cap.

Referring again to FIG. 5, indentations 96 form shoulders which receive a gasket support member 98. A gasket 100 is supported by member 98, one side 102 of gasket 100 forming a sealing surface engaging sealing lip 84.

Sealing surface 102 is normally held in engagement with sealing lip 84 by the cooperating threads on securing flange 90 and cap rim 94. As cap 58 is unscrewed for removal from filler pipe 48, sealing surface 102 of gasket 100 moves away from sealing lip 84. The pressure in tank 10 is then released through apertures 88 before cap 58 is completely removed from filler pipe 48. The length of the thread along cap rim 94 determines the time necessary to remove cap 58 from filler pipe 48 and may be proportioned to assure adequate time for release of all pressure within tank 10.

Gasket 100 and gasket support 98 are provided with a central opening 104. A stamped sheet metal umbrella-shaped valve member 106 has a peripheral lip 108 engaging sealing surface 102 of gasket 100. Valve member 106 also has a stem 110 which extends through opening 104 and a headed portion 112 which is riveted over and secured to a spring member 114. Spring member 114 has a plurality of fingers 116 which engage support member 98 and bias peripheral lip 108 of valve 106 into engagement with sealing surface 102 of gasket 100.

When fuel is withdrawn from tank 10 or the temperature of tank 10 is lowered, subatmospheric pressure conditions may occur therewithin. This vacuum, acting on valve member 106, will draw the sealing lip 108 of valve 106 away from sealing surface 102. Air then enters tank 10 by passing between filler neck 50 and securing flange 90 through a filter medium 118, apertures 88, about the outer rim of gasket 100, through apertures 120 in gasket support 98, between peripheral indentations 96 in cap rim 94, and through opening 104 about valve member 106.

From the foregoing, it will be appreciated that the filler cap and neck construction provided by this invention is well adapted to control the pressure in tank 10, relieving vacuum by admitting filtered air and releasing pressure during removal of the cap from the filler neck.

We claim:

1. A filler cap for a fuel tank having a filler pipe including a main filler neck, an annular sealing lip disposed at one end of said neck and extending radially therefrom, an apertured portion extending radially outwardly from said sealing lip, and a securing flange spaced radially outwardly from and surrounding said neck and extending axially from the outer edge of said apertured portion, said flange having a thread rolled therein, said filler cap comprising a cupped housing having an axially extending rim, said rim including a plurality of peripherally spaced indentations forming shoulders between the ends thereof, an annular gasket secured to said shoulders and spaced radially inwardly from said rim and having a sealing surface adapted to engage said filler pipe sealing lip, said rim having a thread rolled therein adapted to engage said filler pipe securing flange thread and being of sufficient length to permit said gasket to disengage from said filler pipe sealing lip before said cap rim thread disengages from said filler pipe securing flange thread whereby pressure within said tank may be released between said gasket and said sealing lip through said apertured portion of said filler pipe prior to removal of said cap from said filler pipe, said filler cap further comprising a stamped sheet metal umbrella-shaped valve member having a peripheral lip engaging said sealing surface of said gasket and a stem extending axially through a central opening defined in said gasket, and spring means engaging said stem to bias said peripheral lip against said sealing surface of said gasket, said spring means being adapted to be overcome by subatmospheric pressure in said tank acting on said valve member whereby subatmospheric pressure in said tank may be relieved by air passing through said apertured portion of said filler pipe, about said annular gasket between said peripheral indentations in said rim, and through said central opening in said gasket about said valve member into said tank.

2. A filler pipe and cap for a fuel tank, said filler pipe comprising a main filler neck, an annular sealing lip disposed at one end of said neck and extending radially therefrom, an apertured portion extending radially outwardly from said sealing lip, and a securing flange spaced radially outwardly from and surrounding said neck and extending axially from the outer edge of said apertured portion, said flange having a thread rolled therein, and said cap comprising a cupped housing having an axially extending rim, said rim including a plurality of peripherally spaced indentations forming shoulders between the ends thereof, an annular gasket secured to said shoulders and spaced radially inwardly from said rim and having a sealing surface engaging said filler pipe sealing lip, said rim having a thread rolled therein engaging said filler pipe securing flange thread and being of sufficient length to permit said gasket to disengage from said filler pipe sealing lip before said cap rim thread disengages from said filler pipe securing flange thread whereby pressure within said tank may be released between said gasket and said sealing lip through said apertured portion of said filler pipe prior to removal of said cap from said filler pipe, said cap further comprising a stamped sheet metal umbrella-shaped valve member having a peripheral lip engaging said sealing surface of said gasket and a stem extending axially through a central opening defined in said gasket, and spring means engaging said stem to bias said peripheral lip against said sealing surface of said gasket, said spring means being adapted to be overcome by subatmospheric pressure in said tank acting on said valve member whereby subatmospheric pressure in said tank may be relieved by air passing through said apertured portion of said filler pipe, about said annular gasket between said peripheral indentations in said rim, an through said central opening in said gasket about said valve member into said tank.

3. The filler pipe and cap of claim 2 which further comprises a filter medium disposed over said apertured member between said main filler neck and said securing flange to prevent dirt from entering said tank as subatmospheric pressure is relieved.

* * * * *